(12) United States Patent
Gupta

(10) Patent No.: US 11,657,378 B2
(45) Date of Patent: May 23, 2023

(54) SECURE KINETIC KEY PATTERNS WITH SOFT ASSIST FOR VISION-IMPAIRED USERS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 95 days.

(21) Appl. No.: 17/325,505

(22) Filed: May 20, 2021

(65) Prior Publication Data
US 2022/0374856 A1 Nov. 24, 2022

(51) Int. Cl.
*G06F 21/31* (2013.01)
*G06F 3/0488* (2022.01)
*G06Q 20/20* (2012.01)

(52) U.S. Cl.
CPC ......... *G06Q 20/206* (2013.01); *G06F 3/0488* (2013.01); *G06F 21/316* (2013.01)

(58) Field of Classification Search
None
See application file for complete search history.

(56) References Cited

U.S. PATENT DOCUMENTS

| | | | | |
|---|---|---|---|---|
| 8,539,550 B1* | 9/2013 | Terres | ..................... | G06F 21/31 726/16 |
| 2003/0210282 A1* | 11/2003 | Bosma | .................. | G06F 3/0481 715/845 |
| 2005/0154991 A1* | 7/2005 | Jaeger | .................... | G06F 3/0481 715/752 |
| 2006/0136833 A1* | 6/2006 | Dertinger | .............. | G06F 3/0486 715/845 |
| 2009/0307623 A1* | 12/2009 | Agarawala | .......... | G06F 3/04815 345/173 |
| 2012/0046077 A1* | 2/2012 | Kim | ...................... | H04W 12/06 455/566 |
| 2012/0216150 A1* | 8/2012 | Wernecke | ........... | G06F 3/04886 715/850 |
| 2014/0095388 A1* | 4/2014 | Colnot | ................. | G06Q 20/425 705/44 |
| 2014/0109010 A1* | 4/2014 | Casey | ................. | G06F 3/04883 715/835 |
| 2014/0118267 A1* | 5/2014 | Thomas | ................ | G06F 21/316 345/173 |
| 2014/0137039 A1* | 5/2014 | Kroeger | .............. | G06F 3/04817 715/810 |

(Continued)

*Primary Examiner* — Ryan Barrett
(74) *Attorney, Agent, or Firm* — Weiss & Arons LLP

(57) ABSTRACT

Apparatus and methods for authenticating a user of a transaction device are provided. The methods may include designating an element of the device as a focal point. The methods may include storing the focal point in a transaction system database. The methods may include receiving from the device a gesture pattern. The methods may include determining that the pattern identifies the focal point. The methods may include accepting the focal point. The methods may include authenticating the user. The methods may include receiving, after the authenticating, from the user a personal identification number ("PIN") that is associated with a transaction card of the user that is not present at the transaction.

23 Claims, 9 Drawing Sheets

(56) References Cited

U.S. PATENT DOCUMENTS

| | | | | |
|---|---|---|---|---|
| 2014/0145821 A1* | 5/2014 | Wang | ............... | G07C 9/33 |
| | | | | 340/5.54 |
| 2014/0304806 A1* | 10/2014 | Koo | ............... | G06K 19/063 |
| | | | | 726/16 |
| 2014/0373132 A1* | 12/2014 | Basmov | ............... | G06F 21/31 |
| | | | | 726/19 |
| 2016/0195995 A1* | 7/2016 | Thibadeau, Sr. | ... | G06F 3/04883 |
| | | | | 726/7 |
| 2022/0261147 A1* | 8/2022 | Welch | ............... | G06F 3/0484 |

* cited by examiner

SECURE KINETIC KEY PATTERNS WITH SOFT ASSIST FOR VISION-IMPAIRED USERS

BACKGROUND

Electronic transactions typically rely on cards or devices (e.g., mobile phone, laptop, desktop, payment wallets) for authentication of an individual's identity. If the individual forgets the card or device, the individual may be unable to be authenticated, and therefore may be unable to perform the transaction.

Biometric authentication may avoid the aforementioned mechanisms, but biometric authentication is expensive and may not be feasible for wide deployment.

It would be desirable therefore to provide apparatus and methods for authentication that do not require a card or personal device.

SUMMARY

Therefore, apparatus and methods for authenticating a user of a transaction device are provided. The methods may include designating an element of the device as a focal point. The methods may include storing the focal point in a transaction system database. The methods may include receiving from the device a gesture pattern. The methods may include determining that the pattern identifies the focal point. The methods may include accepting the focal point. The methods may include authenticating the user. The methods may include receiving, after the authenticating, from the user a personal identification number ("PIN") that is associated with a transaction card of the user that is not present at the transaction.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

Figure 1:
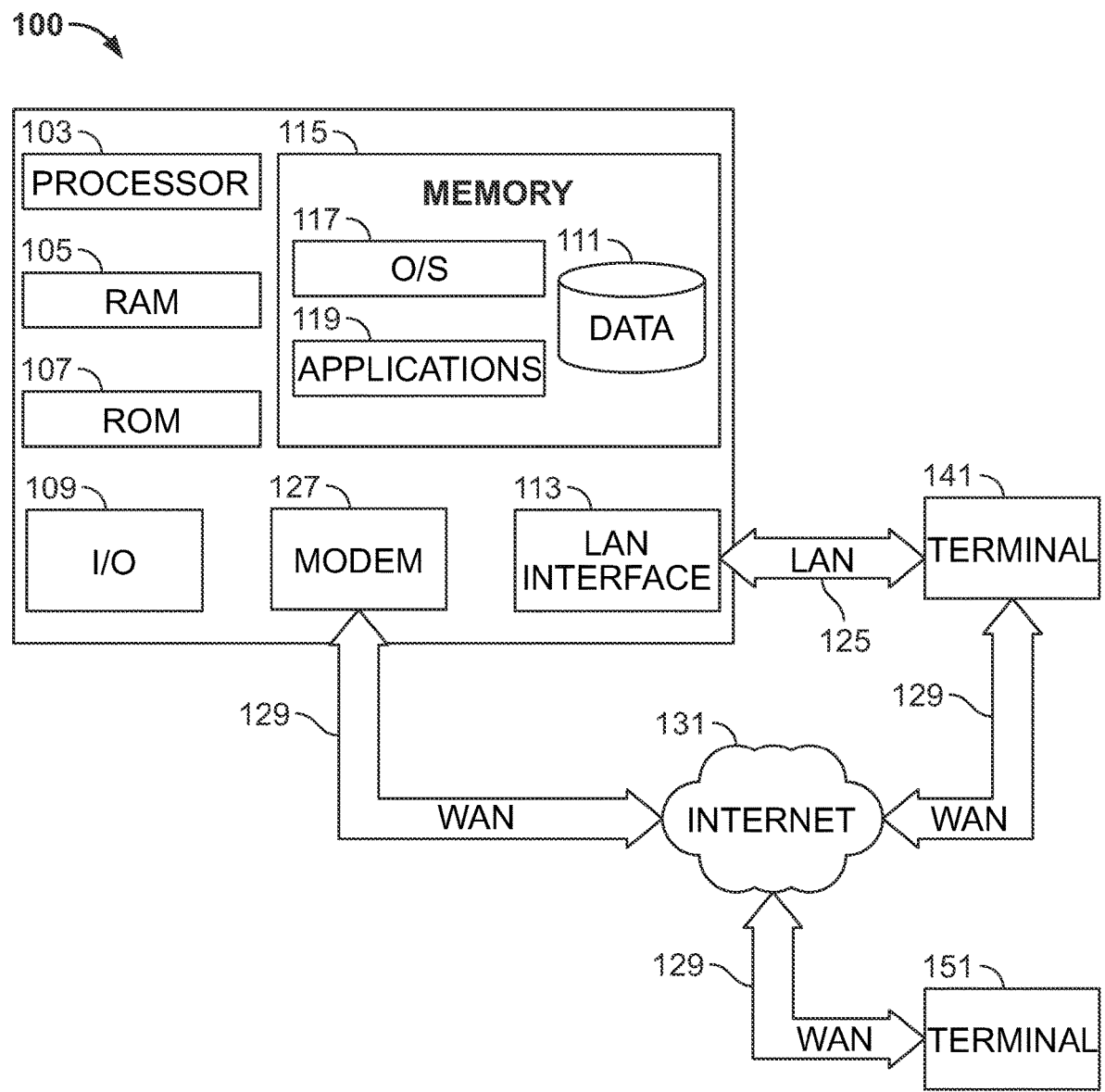
FIG. 1 shows illustrative apparatus in accordance with principles of the invention.

Generally, the leftmost digit (e.g., "L") of a three-digit reference numeral (e.g., "LRR"), and the two leftmost digits (e.g., "LL") of a four-digit reference numeral (e.g., "LLRR"), identify the first figure in which a part is called-out.

DETAILED DESCRIPTION

Kinetic key press authentication technology may allow the user to be authenticated at a transaction device (point of sale ("POS"), on-line terminal or automated transaction machine ("ATM")) by pre-registering a unique key press parameter and then at the time of a transaction implicitly identifying the pre-registered parameter using a key press pattern without involving any card, mobile device, desktop device, laptop device, or any other personal device.

Using this technology, a user will may be able to use any set of keys every time to generate the key press pattern. A typical key pad available on a typical device may be used. This technology may involve software upgrades to existing transaction devices to provide pattern recognition technology. Patterns may be captured at the transaction device, encrypted and sent to an authenticator for verification. The authenticator may include an enterprise or a third-party authentication service.

Authentication may occur entirely locally to the key pad. Authentication may occur entirely remotely from the key pad. Authentication may occur partially locally to the key pad and partially remotely from the key pad.

The technology may be used by vision impaired individuals.

Apparatus and methods for authenticating a user of a transaction device are provided.

The methods may include designating an element of the device as a focal point. The methods may include storing the focal point in a transaction system database. The methods may include receiving from the device a gesture pattern. The methods may include determining that the pattern identifies the focal point. The methods may include accepting the focal point. The methods may include authenticating the user. The methods may include receiving, after the authenticating, from the user a personal identification number ("PIN") that is associated with a transaction card of the user that is not present at the transaction.

The gesture pattern may include a key-press pattern.

The pattern may include a number of keys.

The pattern may include a trace.

The pattern may include a first path. The pattern may include a second path. The pattern may include a third path. The third path may be defined by a single key.

The methods may include designating an element of a key pad as a focal point of the device.

The authentication may be an authentication that is based solely on the pattern.

The authentication may be an authentication that is not based on a communication between the device and a user personal device such as a mobile phone, tablet, near-field communication chip, mag stripe, or the like. The authentication may be an authentication that is not based on biometrics. The authentication may be an authentication that is not based on a user gesture. The authentication may be an authentication that is not based on a communication between the device and a user personal device, biometrics or a gesture.

The methods may include designating a different key pad element.

The methods may include identifying a key that the user did not press.

The determining may include identifying a key that is circumscribed by a key sequence. The determining may include identifying a key that is circumscribed by two key sequences. The determining may include identifying a key that is circumscribed by three key sequences.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, key pad, touchscreen and/or stylus through which a user of server 101 may provide input, and may also include one or both of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to trace key press sequences, analyze key press patterns and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
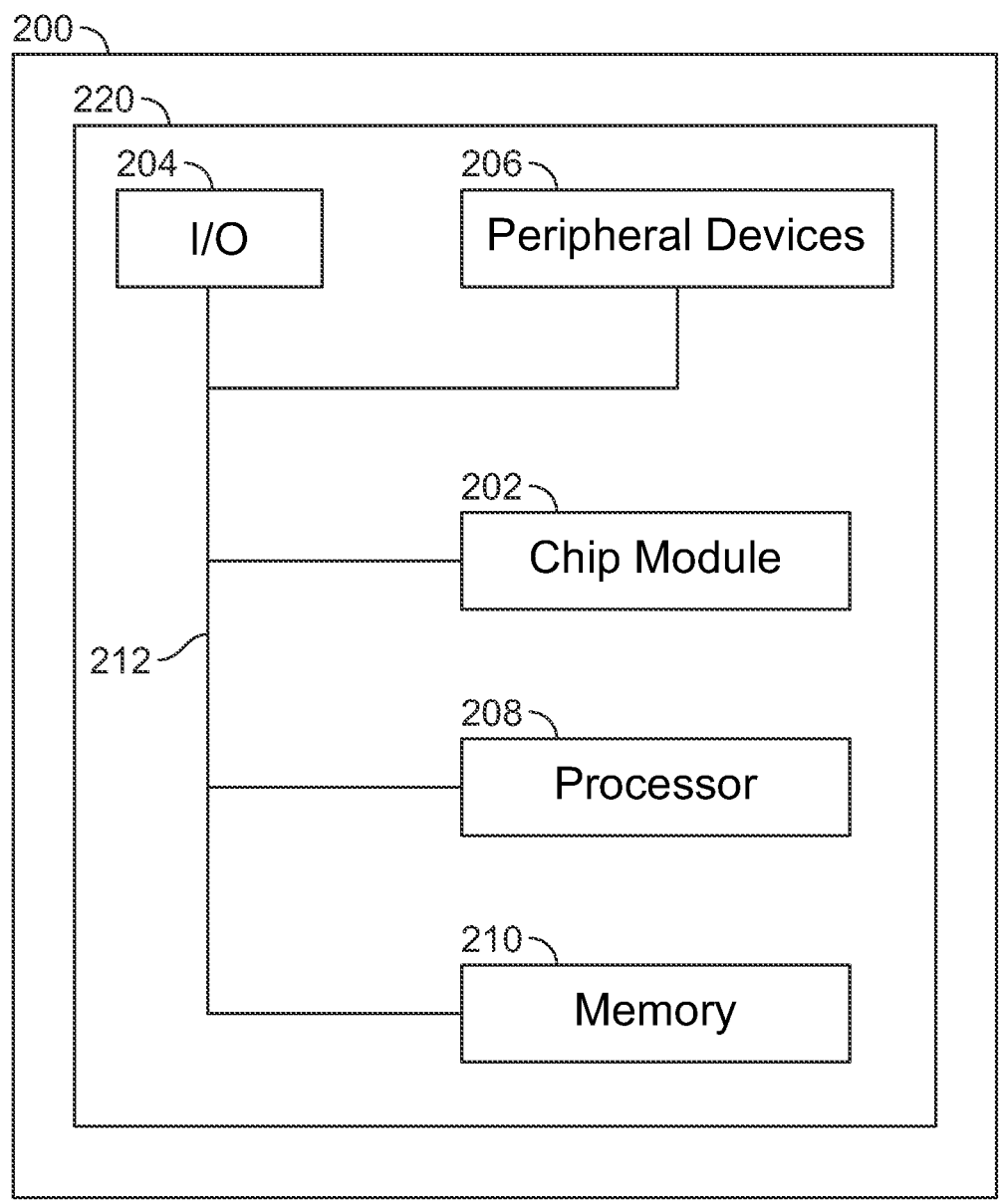
FIG. 2 shows illustrative apparatus in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a key pad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with focal points, key press sequences, key press patterns and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
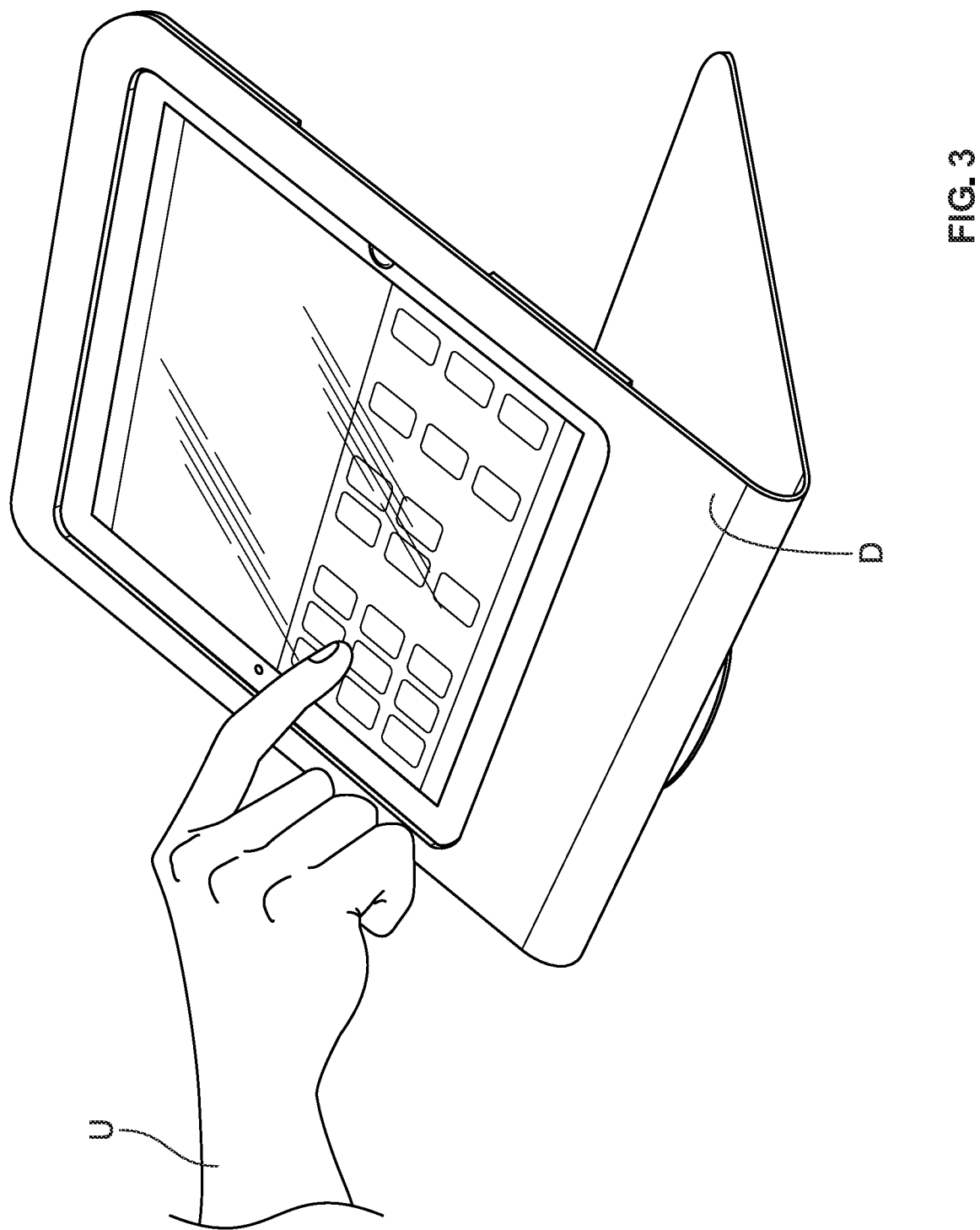
FIG. 3 shows an illustrative apparatus in accordance with principles of the invention.

FIG. 3. shows user U operating on illustrative transaction device D.

Figure 4:
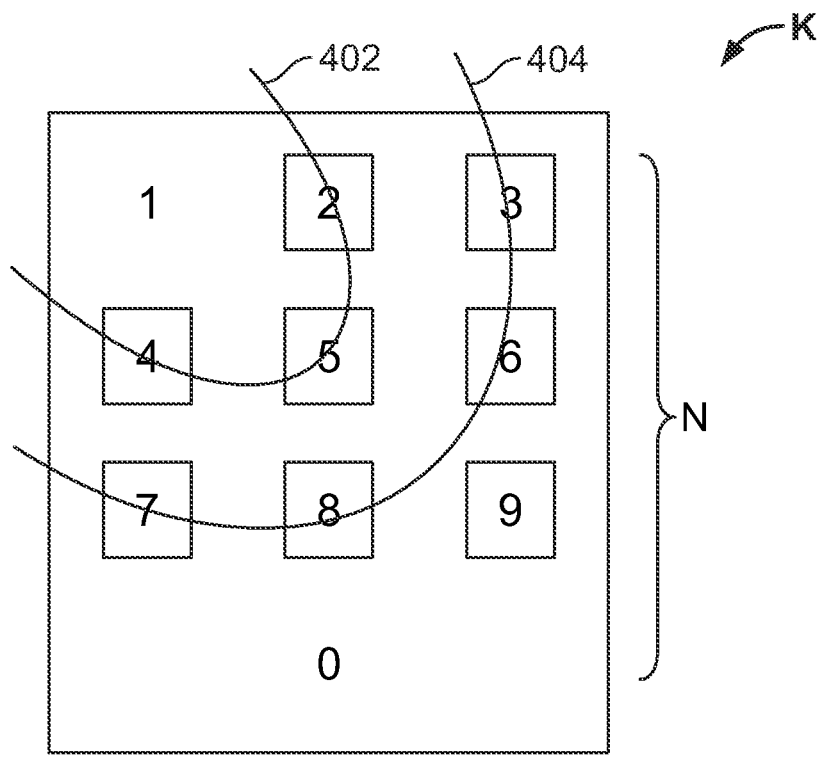
FIG. 4 shows an illustrative schema in accordance with principles of the invention.

FIG. 4 shows illustrative key pad K. Key pad K may be part of a transaction device such as D. Key pad K may include keys N, each of which is identified by a unique numeral: 0, 1, 2, 3, 4, 5, 6, 7, 8, 9. Key N may be mechanical keys. Keys N may be touch-screen keys. Keys N may be contactless gesture sensors.

Prior to use of key pad K by user U, user U may have designated a focal point such as key 1. Prior to use of key pad K by user U, an enterprise function may have designated the focal point. Keys 2-9 are shown with rectangular outlines to indicate that they have been pressed. Keys 1 and 0 are shown without rectangular outlines, to indicate that they have not been pressed. The pressing of keys 2-9 may define paths 402 and 404. Keys 4, 5 and 2 may define path 402. Keys 7, 8, 6 and 3 may define path 404.

Any of keys 0, 1, 2, 3, 4, 5, 6, 7, 8 and 9 may be a focal point.

The keys of path 402 may be pressed sequentially along path 402. The keys of path 402 may be pressed non-sequentially along path 402.

The keys of path 404 may be pressed sequentially along path 402. The keys of path 402 may be pressed non-sequentially along path 404.

The keys of path 402 may be pressed before the keys of path 404. The keys of path 402 may be pressed after the keys of path 404. User U may press a sequence of keys that includes keys from both of paths 402 and 404 in any order. The sequence of keys within a path may be designated a priori. The sequence of paths may be designated a priori.

The non-pressing of key 1 in combination with path 402 may express key 1 as a focal point. The non-pressing of key 1 in combination with path 404 may express key 1 as a focal point. The non-pressing of key 1 in combination with both of paths 402 and 404 may express key 1 as a focal point.

If the expressed focal point matches the designated focal point, user U may be authenticated.

Figure 5:
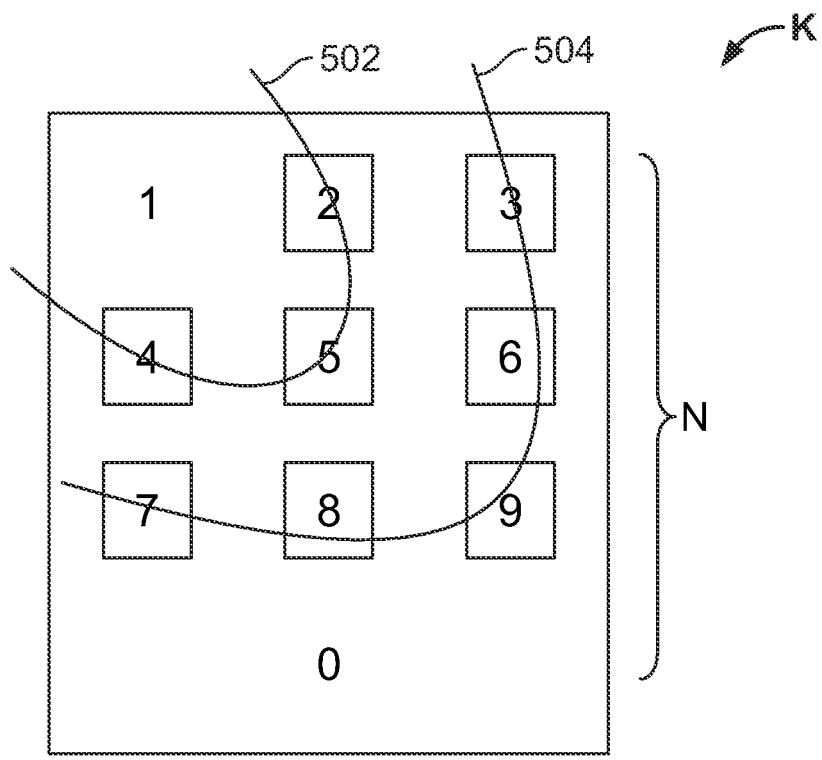
FIG. 5 shows an illustrative schema in accordance with principles of the invention.

FIG. 5 shows illustrative paths 502 and 504 through keys N.

Key 1 may have been designated as the focal point.

The pressing of keys 2-9 may define paths 502 and 504. Keys 4, 5 and 2 may define path 502. Keys 7, 8, 9, 6 and 3 may define path 504.

The keys of path 502 may be pressed sequentially along path 502. The keys of path 502 may be pressed non-sequentially along path 502.

The keys of path 504 may be pressed sequentially along path 502. The keys of path 502 may be pressed non-sequentially along path 504.

The keys of path 502 may be pressed before the keys of path 504. The keys of path 502 may be pressed after the keys of path 504. User U may press a sequence of keys that includes keys from both of paths 502 and 504 in any order.

The non-pressing of key 1 in combination with path 502 may express key 1 as a focal point. The non-pressing of key 1 in combination with path 504 may express key 1 as a focal point. The non-pressing of key 1 in combination with both of paths 502 and 504 may express key 1 as a focal point.

If the expressed focal point matches the designated focal point, user U may be authenticated.

Figure 6:
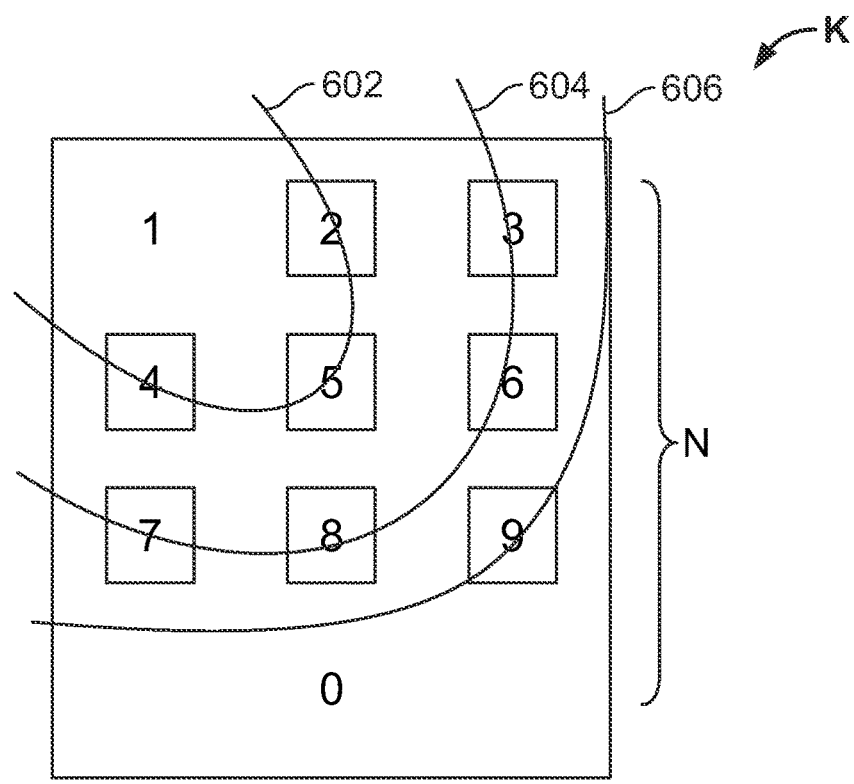
FIG. 6 shows an illustrative schema in accordance with principles of the invention.

FIG. 6 shows illustrative paths 602, 604 and 606 through keys N.

Key 1 may have been designated as the focal point.

The pressing of keys 2-9 may define paths 602, 604 and 606. Keys 4, 5 and 2 may define path 602. Keys 7, 8, 6 and 3 may define path 604. Key 9 may define path 606.

The keys of path 602 may be pressed sequentially along path 602. The keys of path 602 may be pressed non-sequentially along path 602.

The keys of path 604 may be pressed sequentially along path 604. The keys of path 604 may be pressed non-sequentially along path 604.

The paths may be pressed, in full, in any order relative to the other paths. The order of paths may be designated a priori. User U may press a sequence of keys that includes keys from all paths 602, 604 and 606 in any order.

The non-pressing of key 1 in combination with path 602 may express key 1 as a focal point. The non-pressing of key 1 in combination with path 604 may express key 1 as a focal point. The non-pressing of key 1 in combination with path 606 may express key 1 as a focal point. The non-pressing of key 1 in combination with two or more of paths 602, 604 and 606 may express key 1 as a focal point.

If the expressed focal point matches the designated focal point, user U may be authenticated.

Figure 7:
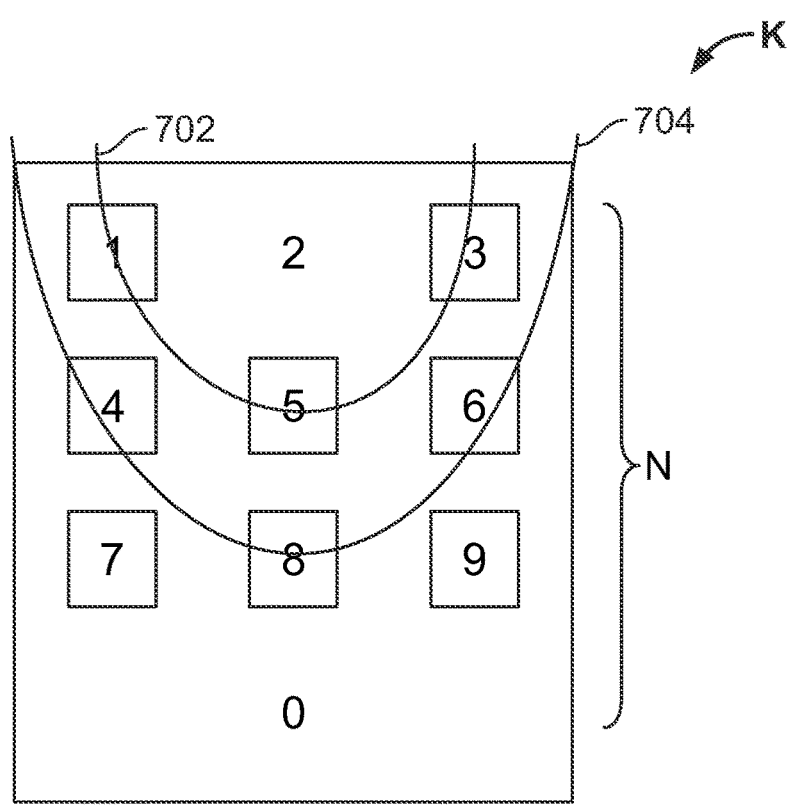
FIG. 7 shows an illustrative schema in accordance with principles of the invention.

FIG. 7 shows illustrative key pad K. Key pad K may be part of a transaction device such as D. Key pad K may include keys N, each of which is identified by a unique numeral: 0, 1, 2, 3, 4, 5, 6, 7, 8, 9.

Key 2 may have been designated as a focal point.

The pressing of keys 2-9 may define paths 702 and 704. Keys 1, 5 and 3 may define path 702. Keys 4, 8 and 6 may define path 704.

The keys of path 702 may be pressed sequentially along path 702. The keys of path 702 may be pressed non-sequentially along path 702.

The keys of path 704 may be pressed sequentially along path 702. The keys of path 702 may be pressed non-sequentially along path 704.

The keys of path 702 may be pressed before the keys of path 704. The keys of path 702 may be pressed after the keys of path 704. User U may press a sequence of keys that includes keys from both of paths 702 and 704 in any order. The sequence of keys within a path may be designated a priori. The sequence of paths may be designated a priori.

The non-pressing of key 2 in combination with path 702 may express key 2 as a focal point. The non-pressing of key 22 in combination with path 704 may express key 2 as a focal point. The non-pressing of key 2 in combination with both of paths 702 and 704 may express key 2 as a focal point.

If the expressed focal point matches the designated focal point, user U may be authenticated.

Figure 8:
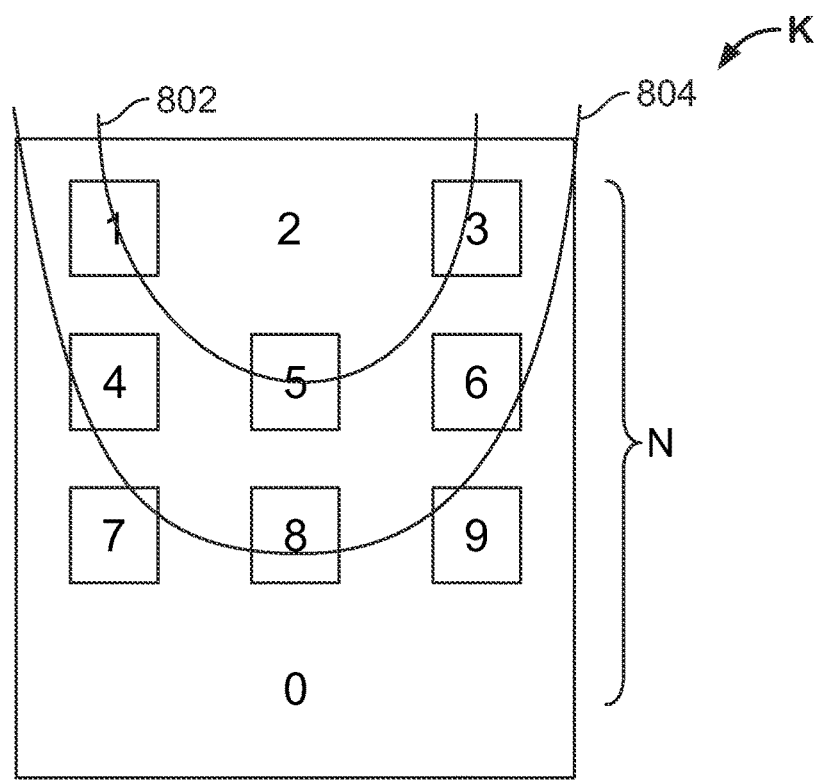
FIG. 8 shows an illustrative schema in accordance with principles of the invention.

FIG. 8 shows illustrative paths 802 and 804 through keys N.

Key 2 may have been designated as the focal point.

The pressing of keys 2-9 may define paths 802 and 804. Keys 1, 5 and 3 may define path 802. Keys 4, 7, 8, 9 and 6 may define path 804.

The keys of path 802 may be pressed sequentially along path 802. The keys of path 802 may be pressed non-sequentially along path 802.

The keys of path 804 may be pressed sequentially along path 802. The keys of path 802 may be pressed non-sequentially along path 804.

The keys of path 802 may be pressed before the keys of path 804. The keys of path 802 may be pressed after the keys of path 804. User U may press a sequence of keys that includes keys from both of paths 802 and 804 in any order.

The non-pressing of key 2 in combination with path 802 may express key 2 as a focal point. The non-pressing of key 2 in combination with path 804 may express key 2 as a focal point. The non-pressing of key 2 in combination with both of paths 802 and 804 may express key 2 as a focal point.

If the expressed focal point matches the designated focal point, user U may be authenticated.

Figure 9:
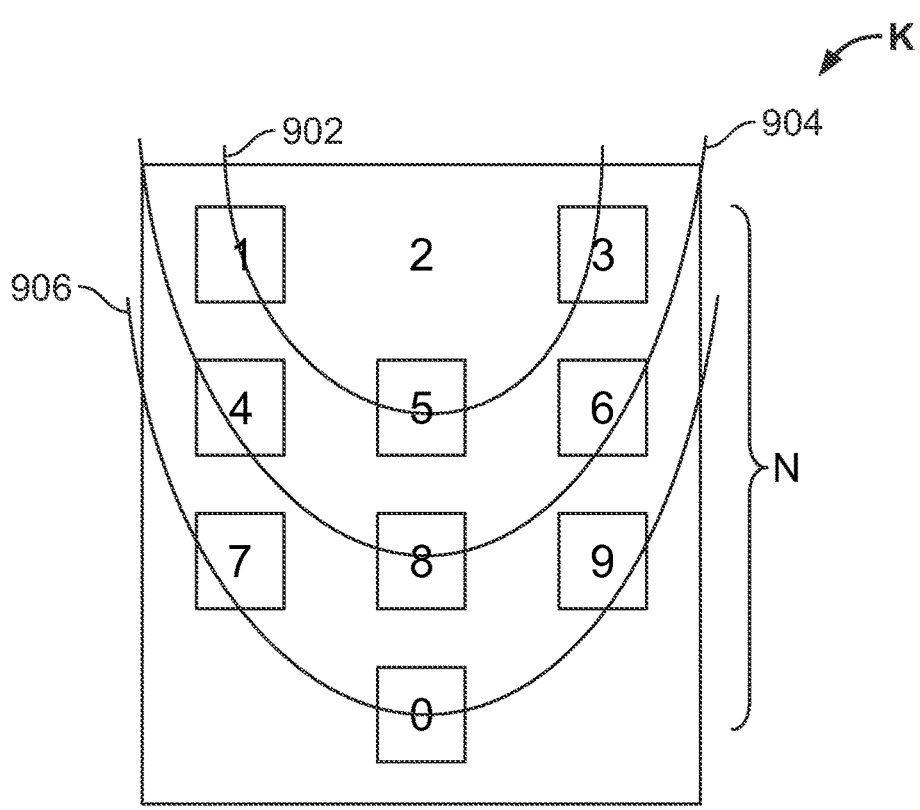
FIG. 9 shows an illustrative schema in accordance with principles of the invention.

FIG. 9 shows illustrative paths 902, 904 and 906 through keys N.

Key 2 may have been designated as the focal point.

The pressing of keys 2-9 may define paths 902, 904 and 906. Keys 1, 5 and 3 may define path 902. Keys 4, 8 and 6 may define path 904. Keys 7, 0 and 9 may define path 906.

The keys of path 902 may be pressed sequentially along path 902. The keys of path 902 may be pressed non-sequentially along path 902.

The keys of path 904 may be pressed sequentially along path 904. The keys of path 904 may be pressed non-sequentially along path 904.

The keys of path 906 may be pressed sequentially along path 906. The keys of path 906 may be pressed non-sequentially along path 906.

The paths may be pressed, in full, in any order relative to the other paths. The order of paths may be designated a priori. User U may press a sequence of keys that includes keys from all paths 902, 904 and 906 in any order.

The non-pressing of key 2 in combination with path 902 may express key 2 as a focal point. The non-pressing of key 2 in combination with path 904 may express key 2 as a focal point. The non-pressing of key 2 in combination with path 906 may express key 2 as a focal point. The non-pressing of key 2 in combination with two or more of paths 902, 904 and 906 may express key 2 as a focal point.

If the expressed focal point matches the designated focal point, user U may be authenticated.

Figure 10:
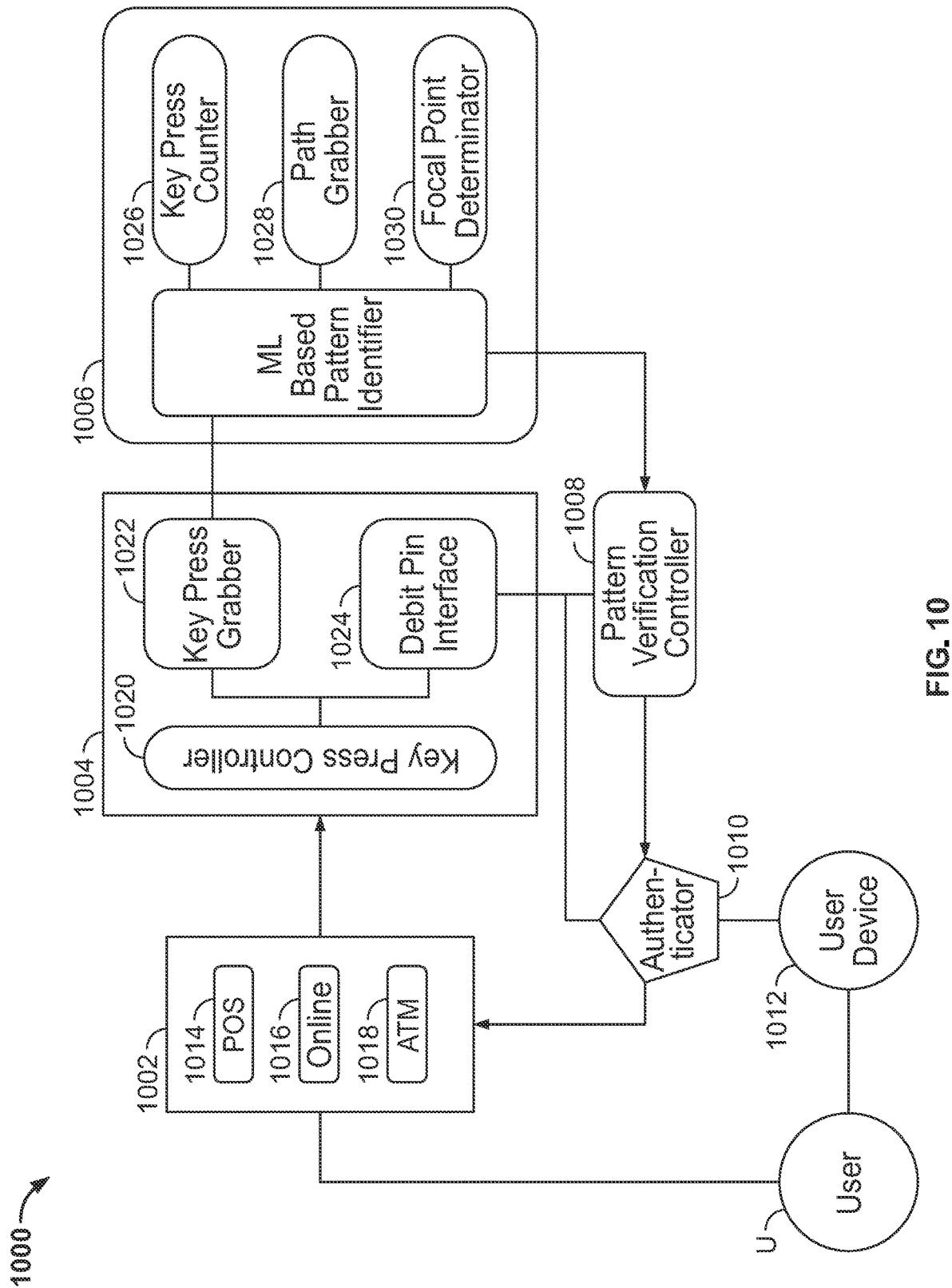
FIG. 10 shows illustrative apparatus in accordance with principles of the invention.

FIG. 10 shows illustrative architecture 1000. Architecture 1000 may include transaction device 1002. Architecture 1000 may include key press trace processor 1004. Architecture 1000 may include pattern identifier 1006. Architecture 1000 may include pattern verification controller 1008. Architecture 1000 may include authenticator 1010. Architecture 1000 may include user device 1012.

User U may perform a transaction using transaction device 1002. User U may not be in possession of user U's transaction card or user U's user device 1012. User U may therefore need a way to authenticate user U to authenticator 1010. Authenticator 1010 may have custody of an asset that belongs to user U. Authenticator 1010 may have records linking user U to the asset. The records may link user U to information possessed by user U, such as a PIN or a focal point. Authenticator 1010 may have the ability to deny user U's access via transaction device 1002 to the assets. Authenticator 1010 may have the ability to permit the access after authenticating the engagement of transaction device 1002 by user U.

User U may use user device 1012 to communicate about a PIN or a focal point with authenticator 1010 prior to performing the transaction using transaction device 1002.

Transaction device 1002 may include one or more of point of sale ("POS") device 1014, online banking client 1016 and automatic transaction machine ("ATM") 1018, any one of which may include a keyboard such as key pad K.

User U may press one or more sequences of keys in one or more paths to identify user U.

Key press trace processor 1004 may include key press controller 1020. Key press analyzer 1004 may include key press grabber 1022. Key press analyzer 1004 may include debit PIN interface 1024. Key press controller 1020 may discriminate between a user PIN and a focal point sequence. Key press controller 1020 may perform the discrimination based on the arrangement of the keys pressed. Key press controller 1020 may perform the discrimination based on the number of keys pressed. Key press controller 1020 may perform the discrimination in response to an instruction received from transaction device 1002. The instruction may be based on a query that transaction device 1002 presents on transaction device 1002 to user U.

Key press controller 1020 may provide illustrative architecture 1000 with the ability to authenticate user U on the bases of: (a) a card and a PIN; (b) a focal point and a PIN; and (c) a focal point alone.

If key press controller 1020 detects a PIN, key press controller 1020 may transmit the PIN to debit PIN interface 1024. Debit PIN interface 1024 may route the PIN to pattern verification controller 1008 or authenticator 1010. Pattern verification controller 1008 may route the PIN to authenticator 1010. Authenticator 1010 may compare the PIN to authenticator 1010's records for authenticating user U based on the PIN.

If key press controller 1020 detects a focal point key press sequence, key press controller 1020 may transmit the sequence to key press grabber 1022. Key press grabber 1022 may route the sequence to pattern identifier 1006. Pattern identifier 1006 may perform machine learning "ML" algorithms on the sequence. The ML algorithms may include key press counter 1026. The ML algorithms may include path grabber 1028. The ML algorithms may include focal point determinator 1030.

The ML algorithms may include vision-impaired assistance for users U that may be vision-impaired. The ML algorithms may be trained to "predict" a path, within a preset margin of error, based on a sequence of key presses. The sequence may be based on a path in which the user omitted a key. The sequence may be based on a path in which the user included a key that lies outside the path. The ML algorithms may use the sequence to predict the most likely path based on the sequence, even if the predicted path does not conform to a physically real sequence of key presses on key pad K.

The margin of error may be adjustable to better serve vision-impaired users while maintaining a desired security level in connection with other users. The margin of error may be adjustable over a communication network.

Focal point determinator 1030 may identify the focal point defined by the key press sequence. The identification may be based on one or more of the pressed keys, the identity of the non-pressed keys, the number of pressed keys and directions of radii of one or more key press paths through keys N.

After focal point determinator 1030 identifies the focal point, focal point determinator 1030 may transmit the focal point to pattern verification controller 1008. Focal point determinator 1030 may transmit the key press sequence to pattern verification controller 1008. Pattern verification controller 1008 may verify that one or both of the focal point and the key press sequence conform to functionality of transaction device 1002.

After pattern verification controller 1008 verifies the focal point, pattern verification controller 1008 may transmit the focal point to authenticator 1010. Authenticator 1010 may authenticate user U based on one or both of the PIN and the focal point.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." A "system" may include one or more of the features of the apparatus and schemae that are shown in FIGS. 1-10 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Figure 11:
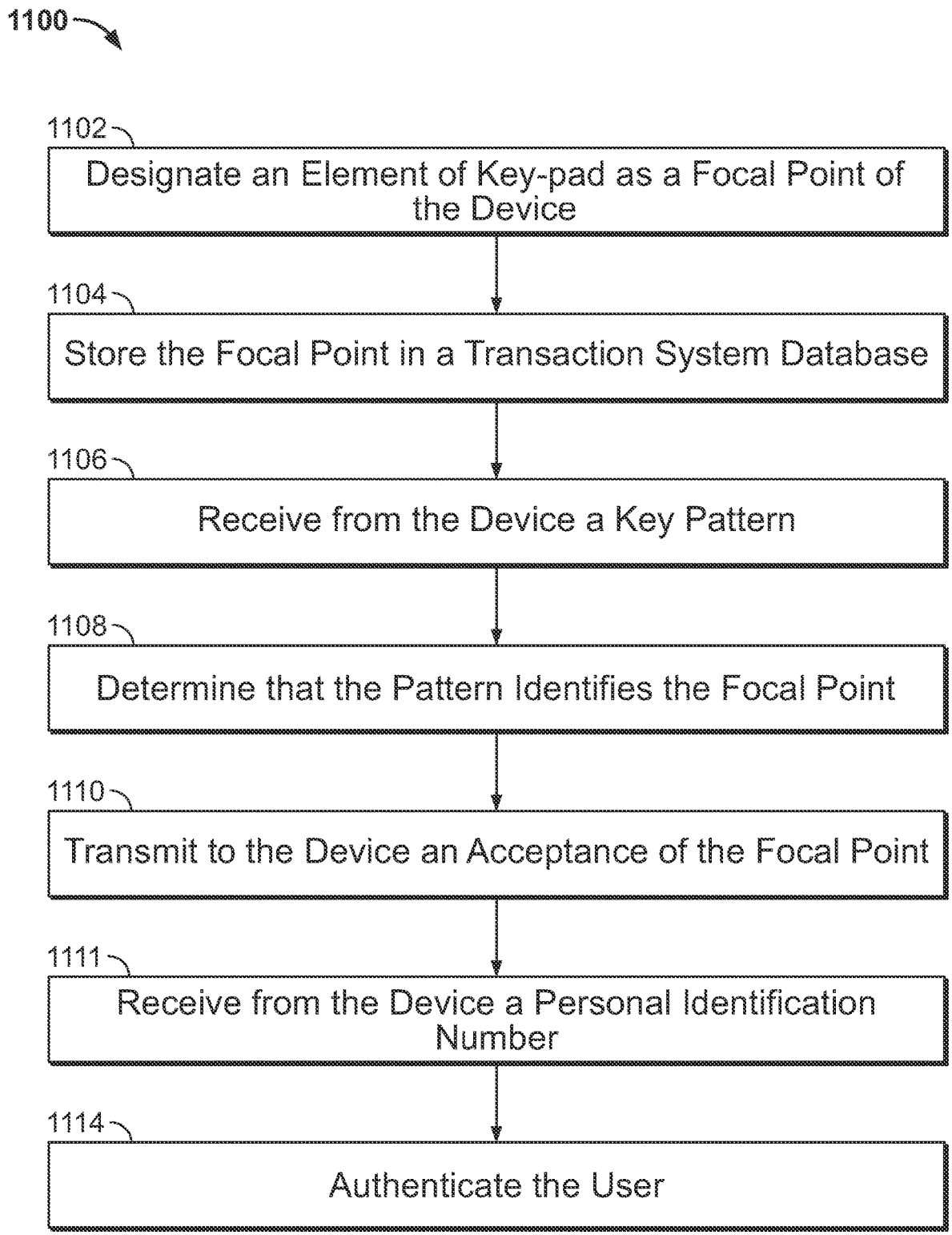
FIG. 11 shows illustrative steps in accordance with principles of the invention.

FIG. 11 shows steps of illustrative process 1100. Process 1100 may begin at step 1102. At step 1102 the system may designate an element of a key pad as a focal point of the device. At step 1104 the system may store the focal point in a transaction system database. At step 1106 the system may receive from the device a key pattern. At step 1107 the system may determine that the pattern identifies the focal point. At step 1110 the system may transmit to the device an acceptance of the focal point. At step 1112 the system may receive from the device a personal identification number. At step 1114 the system may authenticate the user.

Figure 12:
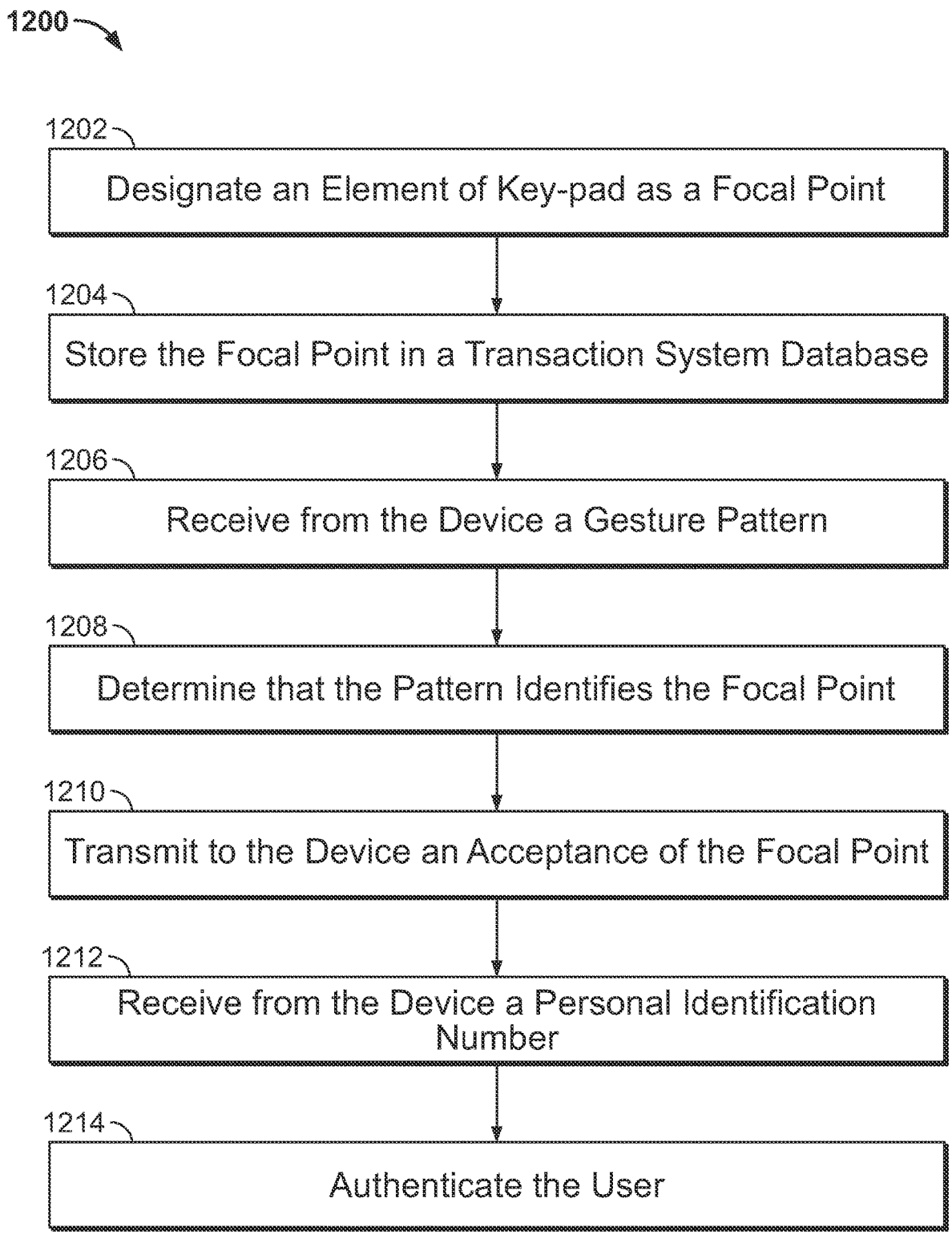
FIG. 12 shows illustrative steps in accordance with principles of the invention.

FIG. 12 shows steps of illustrative process 1200. Process 1200 may begin at step 1202. At step 1202 the system may designate an element of the device as a focal point. At step 1204 the system may store the focal point in a transaction system database. At step 1206 the system may receive from the device a gesture pattern. At step 1208 the system may determine that the pattern identifies the focal point. At step 1210 the system may transmit to the device an acceptance of the focal point. At step 1212 the system may receive from the device a personal identification number. At step 1214 the system may authenticate the user.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for authenticating a user of a transaction device have been provided. Persons skilled in the art will appreciate that the present invention may be practiced by other than the described embodiments, which are presented for purposes of illustration rather than of limitation. The present invention is limited only by the claims that follow.

What is claimed is:

1. A method for performing a transaction with a user of a point-of-sale device, the device comprising a numeric key pad, the method including:
designating an element of the device as a focal point, the element comprising a key on the numeric key pad;
storing the focal point in a transaction system database;
receiving from the device a key-press pattern;
determining that the pattern identifies the focal point;
accepting the focal point; and
authenticating the user;
the device further comprising a machine learning algorithm configured to predict a path within a preset margin of error based on the key-press pattern, the predicted path comprising a key-press pattern in which the user omitted a key or included a key lying outside the path, the margin of error adjustable to accommodate a visual impairment.

2. The method of claim 1 wherein the pattern includes a number of keys.

3. The method of claim 1 wherein the pattern includes a first path.

4. The method of claim 3 wherein the pattern includes a second path.

5. A method for performing a transaction with a user of a transaction device, the device comprising a numeric key pad, the method including:
designating an element of the numeric key pad as a focal point;
storing the focal point in a transaction system database;
receiving from a device a key pattern;
determining that the pattern identifies the focal point;
accepting the focal point; and
using a machine learning algorithm, predicting a path within a preset margin of error based on the key pattern, the predicted path comprising a key pattern in which the user omitted a key, the margin of error adjustable to accommodate a visual impairment.

6. The method of claim 5 further comprising authenticating the user based on acceptance of the focal point.

7. The method of claim 5 wherein the key pattern includes a key-press pattern.

8. The method of claim 5 wherein the pattern includes a number of keys.

9. The method of claim 5 wherein the pattern includes a first path.

10. The method of claim 5 wherein the pattern includes a second path.

11. The method of claim 5 wherein the pattern includes a third path.

12. The method of claim 11 wherein the third path is defined by a single key.

13. The method of claim 5 wherein the authentication is based solely on the pattern.

14. The method of claim 5 wherein the authentication is not based on a communication between the device and a user personal device.

15. The method of claim 5 further comprising designating a different key pad element.

16. The method of claim 5 wherein the determining includes identifying a key that was not pressed.

17. The method of claim 5 wherein the determining includes identifying a key that is circumscribed by a key sequence.

18. The method of claim 5 wherein the determining includes identifying a key that is circumscribed by two key sequences.

19. The method of claim 5 wherein the determining includes identifying a key that is circumscribed by three key sequences.

20. A method for performing a transaction with a user of a transaction device, the device comprising a numeric key pad, the method including:
designating an element of a key pad as a focal point of the device, the element comprising a key on the numeric key pad;
storing the focal point in a transaction system database;
receiving from the device a key pattern;
determining that the pattern identifies the focal point;
accepting the focal point;
authenticating the user; and
using a machine learning algorithm, predicting a path within a preset margin of error based on the key pattern, the predicted path comprising a key pattern in which the user included a key lying outside the path, the margin of error adjustable to accommodate a visual impairment.

21. The method of claim 20 wherein the gesture pattern includes a key-press pattern.

22. The method of claim 20 wherein the pattern includes a number of keys.

23. The method of claim 20 wherein the pattern includes a path.

* * * * *